US010223708B2

(12) United States Patent
Pirillo

(10) Patent No.: US 10,223,708 B2
(45) Date of Patent: Mar. 5, 2019

(54) MOBILE REWARDS REDEMPTION SYSTEM ASSOCIATED WITH PREPAID CARD MANAGEMENT ACCOUNTS

(71) Applicant: Maritz Holdings Inc., Fenton, MO (US)

(72) Inventor: Carlo Pirillo, Mississauga (CA)

(*) Notice: Subject to any disclaimer, the term of this patent is extended or adjusted under 35 U.S.C. 154(b) by 0 days.

(21) Appl. No.: 14/058,666

(22) Filed: Oct. 21, 2013

(65) Prior Publication Data

US 2014/0108120 A1 Apr. 17, 2014

Related U.S. Application Data

(63) Continuation of application No. 13/465,749, filed on May 7, 2012, now abandoned.

(60) Provisional application No. 61/569,051, filed on Dec. 9, 2011, provisional application No. 61/486,821, filed on May 17, 2011.

(51) Int. Cl.
*G06Q 30/02* (2012.01)

(52) U.S. Cl.
CPC ..... *G06Q 30/0226* (2013.01); *G06Q 30/0229* (2013.01); *G06Q 30/0239* (2013.01); *G06Q 30/02* (2013.01); *G06Q 30/0236* (2013.01)

(58) Field of Classification Search
CPC ............... G06Q 30/02; G06Q 30/0226; G06Q 30/0229; G06Q 30/0239; G06Q 30/0236
USPC ...................................... 705/14.33
See application file for complete search history.

(56) References Cited

U.S. PATENT DOCUMENTS

| 7,698,185 B2 | 4/2010 | Hofer et al. | |
|---|---|---|---|
| 7,769,630 B2 | 8/2010 | Postrel | |
| 8,510,161 B2 | 8/2013 | Murray | |
| 2001/0054003 A1* | 12/2001 | Chien | G06Q 20/04 705/14.17 |
| 2002/0107791 A1* | 8/2002 | Nobrega | G06Q 20/02 705/39 |
| 2003/0069857 A1* | 4/2003 | Junda | G06F 21/6263 705/74 |
| 2004/0230481 A1* | 11/2004 | Bushold | G06Q 20/20 715/764 |
| 2005/0251446 A1* | 11/2005 | Jiang | G06Q 20/06 705/14.38 |
| 2007/0265984 A1* | 11/2007 | Santhana | G06Q 20/10 705/65 |
| 2007/0278293 A1* | 12/2007 | Anderson | G09F 1/00 235/380 |
| 2008/0054081 A1* | 3/2008 | Mullen | G06K 19/077 235/494 |

(Continued)

OTHER PUBLICATIONS

Consumers use mobile phones to tap-to-pay and earn rewards at grocery stores in Texas. (Nov. 9, 2010). PR Newswire.*

(Continued)

*Primary Examiner* — Timothy Padot
(74) *Attorney, Agent, or Firm* — Wick Phillips Gould & Martin LLP; Jerry C. Harris, Jr.

(57) ABSTRACT

A mobile rewards real-time redemption system allows members of programs to use a mobile rewards redemption application via their mobile device to redeem currency or points. A 'ghost' credit/debit vehicle (account) is used to redeem the rewards currency or points. The ghost card completes the financial transaction which is, from the perspective of a redemption retailer, a conventional card transaction.

9 Claims, 5 Drawing Sheets

(56) References Cited

U.S. PATENT DOCUMENTS

| | | | | |
|---|---|---|---|---|
| 2008/0133366 A1* | 6/2008 | Evans | ............ | G06Q 30/02 705/14.26 |
| 2009/0006212 A1* | 1/2009 | Krajicek | ............ | G06Q 20/12 705/14.35 |
| 2009/0132415 A1* | 5/2009 | Davis | ............ | G06Q 20/10 705/43 |
| 2012/0041808 A1* | 2/2012 | Hofer | ............ | G06Q 20/32 705/14.17 |
| 2012/0253852 A1* | 10/2012 | Pourfallah | ............ | G06Q 20/3276 705/4 |
| 2012/0271763 A1* | 10/2012 | Toms | ............ | G06Q 40/02 705/41 |
| 2012/0296720 A1 | 11/2012 | Pirillo | | |

OTHER PUBLICATIONS

MobileLime(R) unveils next generation NFC-based mobile shopping platform; enhanced mobile wallet lets consumers 'shop 'n go' with their cell phones to instantly get rewards and pay for purchases at their favorite merchants. (Feb. 21, 2006). Business Wire.*

Transaction Wireless Enters Into First Processor Licensing Agreement With Secure Payment Systems for Wireless Gift Card Technology. Business Wire Apr. 24, 2007: NA.*

Gasoline Doesn't Fuel This Loyalty Program. Business Wire Jul. 11, 2006: NA.*

Filing receipt and specification for provisional patent application entitled "Mobile Rewards Redemption System and Method," by Carlo Pirillo, filed Dec. 9, 2011 as U.S. Appl. No. 61/569,051.

Filing receipt and specification for provisional patent application entitled "Mobile Rewards Redemption System and Method,"by Carlo Pirillo, filed May 17, 2011 as U.S. Appl. No. 61/486,821.

Office Action (Final) dated Dec. 20, 2013 (23 pages), U.S. Appl. No. 13/465,749, filed May 7, 2012.

Office Action dated Aug. 29, 2013 (16 pages), U.S. Appl. No. 13/465,749, filed May 7, 2012.

"Carlson Marketing Launches Instant Rewards on Mobile Devices," BusinessWire, Jun. 17, 2010, http://www.businesswire.com/news/home/20100617006374/en/Carlson-Marketing-Launches-Instant-Rewards-Mobile-Devices#.U9IPS_IdXz8, 2 pages.

Fitzgerald, Kate, "Starbucks Going National With Its Mobile-Payment System," PaymentsSource, Dec. 2, 2010, Source Media, http://www.paymentssource.com/news/starbucks-going-national-mobile-payment-3004174-1.html, 2 pages.

Musthaler, Linda, "Why you should use your smartphone as your credit card," Network World, Aug. 27, 2010, Network World, Inc. http://www.networkworld.com/article/2217311/smartphones/why-you-should-use-your-smartphone-as-your-credit-card.html, 4 pages.

* cited by examiner

MOBILE REWARDS REDEMPTION SYSTEM ASSOCIATED WITH PREPAID CARD MANAGEMENT ACCOUNTS

CROSS-REFERENCE TO RELATED APPLICATIONS

This application is a continuation application of and claims priority from U.S. patent application Ser. No. 13/465,749 filed on May 7, 2012, which claims priority from both U.S. Provisional Application No. 61/569,051 filed on Dec. 9, 2011 and U.S. Provisional Application No. 61/486,821 filed on May 17, 2011. The entirety of the foregoing applications are incorporated by reference herein.

BACKGROUND OF THE INVENTION

The present invention generally relates to systems and methods for allowing participants in a program, such as an incentive, loyalty, frequency, affinity, retention, performance improvement or award program, to redeem points or other currency awarded to the participant by the program. In particular, the present invention relates to real-time or near real-time point redemption during a point-of-sale transaction.

Some prior redemption systems are not instantaneous because there are delays from the time an rewards fulfillment request is made to the time when the requested rewards are awarded so that the member receives the requested rewards. In addition, many such programs require the redemption system to have rewards in inventory in order to provide instant rewards.

SUMMARY OF THE INVENTION

A mobile rewards real-time redemption system allows members of programs such as an incentive, loyalty, frequency, affinity, retention, performance improvement or award program to use a mobile rewards redemption application to redeem currency or points stored in a database of the program (which may be held by a third party). This solution will utilize a "ghost" credit vehicle (account) or card to complete the financial transaction which is, from the perspective of a redemption retailer, a conventional credit transaction. Because of this, no integration or modifications are required on the participating retailers POS systems. The "ghost" card will not be visible or accessible to the member.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
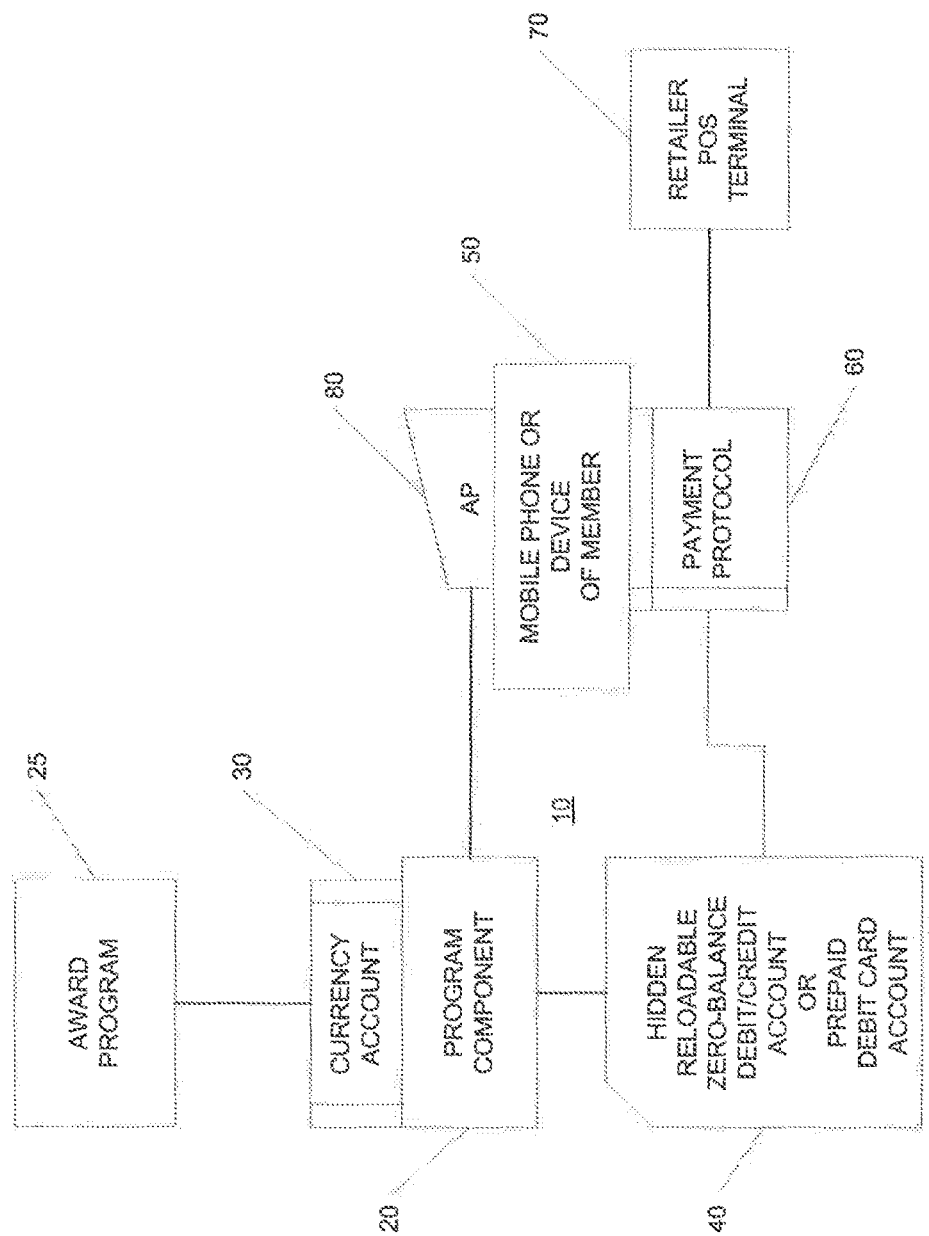
FIG. 1 is a block diagram of a system according to one embodiment of the invention.

FIG. 1 is a block diagram of a system 10 according to one embodiment of the invention. The system includes a program component 20 for managing currency accounts (such as a points account) of people involved in the program (e.g., program members). For example, each account may be associated with a program providing points earned by a person based on loyalty, based on incentives awarded for previous purchases or based on some other incentive, loyalty, frequency, affinity, retention, performance improvement or award program involving the person, a person's activities, a person's accounts and/or a person's transactions, hereinafter collectively referred to as an award program 25. In many embodiments, the program component 20 is a server or other processor executing computer readable instructions for implementing the award program 25 which awards and/or keeps track of points. Such programs frequently have a sponsor, retailer or administrator implementing the program, participating retailers and/or participating consumers, each of which has certain access rights to the program. In some embodiments, there is only one participating retailer who also is the sponsor/administrator.

The program component 20 also has computer executable instructions for implementing a debit/credit account 40 associated with, assigned to or otherwise usable with a currency (points) account 30 of a program member.

In one embodiment, the debit/credit account 40 is a hidden, reloadable, debit or credit account initially having a zero balance. The account is provided by a prepaid card management system. In another embodiment, the debit/credit account 40 is a prepaid debit card account, such as a gift card account, provided by a card management system of a retailer offering the award program 25 associated with the user's currency account 30. The prepaid retailer account may be a hidden, reloadable, debit or credit account initially having a zero balance. Alternatively, the prepaid retailer account may be associated with a particular currency account 30 of a particular member of the award program and may have a balance corresponding to the balance of the particular currency account 20 with which it is associated.

This type of account 40 may be referred to as a "ghost" account or a hidden account because the account number is not known and/or accessible by the person assigned to the account. The person for which the account is used for their benefit does not necessarily need to know the account number or its details. In other words, the debit/credit account 40 is used for the benefit of a person (e.g., a member of the program) but the debit/credit account 40 is hidden from the person and the person is never provided with any identification details regarding the account 40. Currency or points are deposited in the member's currency account 30 based on the member's activities, such as based on the award program. In one embodiment, only one, unique debit/credit card account is associated with only one, unique currency account of a user so that transactions can be tracked by either the card account number or the currency account number. In one embodiment, only one, unique debit/credit card account is associated with all currency accounts of only one, particular user so that all transactions of the particular user can be tracked by the card account number.

A mobile device 50 (e.g., smart phone) of each person who is a member of the award program is used by each member as part of the system 10. The mobile device 50 has a payment protocol 60. The mobile device 50 is used at a terminal 70 at a point-of-sale of a retailer. The terminal 70 communicates with the mobile device via the payment protocol 60 to effect a transaction between the member and the retailer in which the member purchases goods/services from the retailer at a purchase price.

An application 80 executable by the mobile device communicates with the program component 20 and converts currency (points) in the member's currency account 30 into an amount applied to the debit/credit account 40. As a result, at least part of the transaction is paid by debit/credit account 40 so that a part of the purchase price for the goods/services purchased by the member from the retailer comprises currency from the member's currency account 30 applied to the transaction via the debit/credit account 40.

Figure 2:
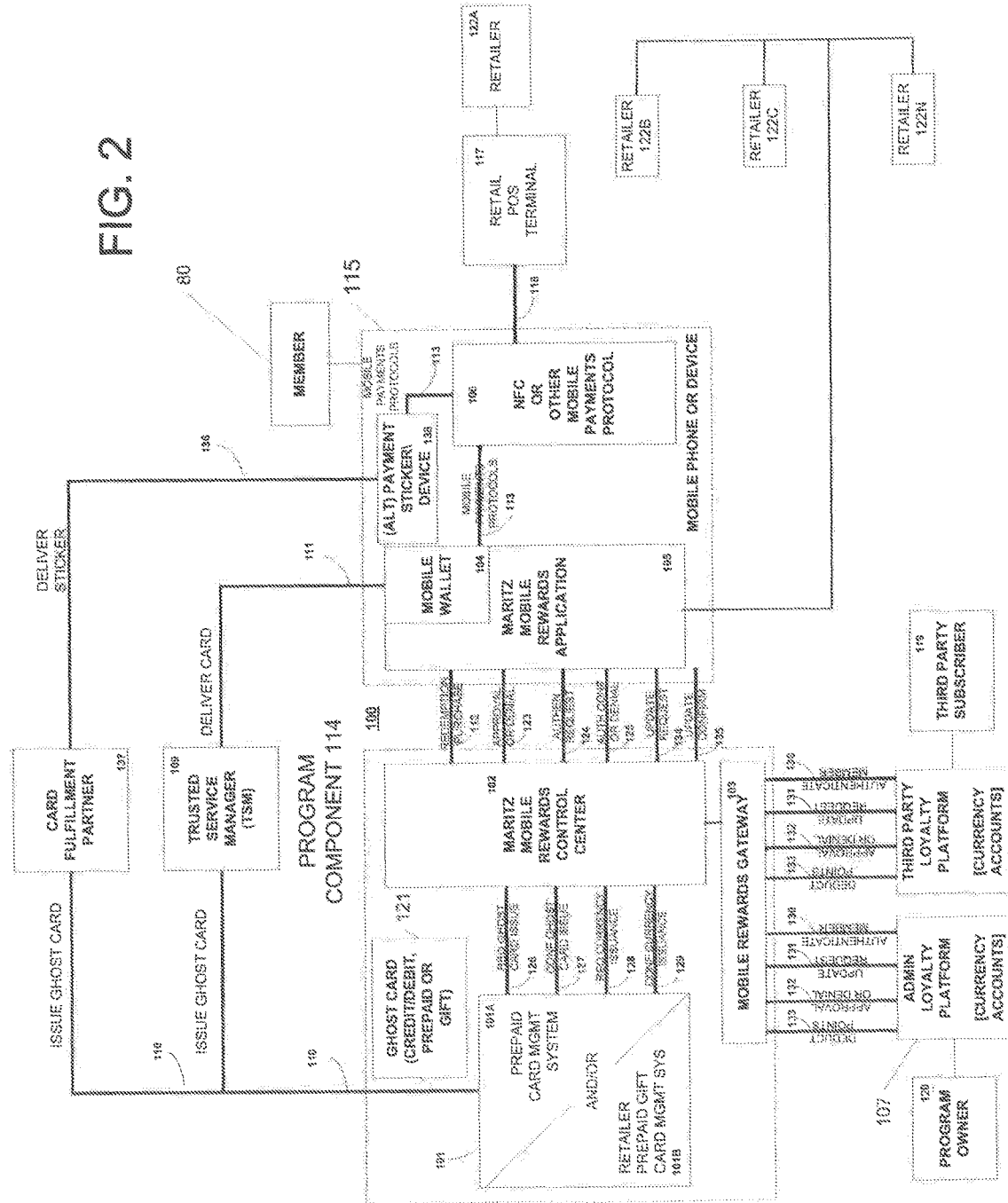
FIG. 2 is an illustration of the various components and their interaction according to one embodiment of the invention.

FIG. 2 is an illustration of the various components and their interaction according to one embodiment of the invention. In particular, FIG. 2 illustrates one configuration of an administrator's mobile rewards system 100 for implementing real-time or near real-time redemption during a point-of-sale transaction according to the invention. In this embodiment, the system 100 includes a program component 114, such as a server, for interfacing with a mobile device 115, such as a smart phone, of a member 80 of one or more award programs 107, 108 (e.g., operated by a server). The mobile device 115 includes a mobile wallet 104, a mobile rewards application 105 and a near-field communication (NFC) or other mobile payments protocol 106, each of which may be an embedded part of the device 115 or may be a software application (e.g., an "APP") which is downloaded and installed into the device 115. The protocol communicates with a retailer's point-of-sale terminal 117 which effects purchase transactions of a retailer 122.

The program component 114 as illustrated includes a mobile rewards control center 102 which is an interface for communicating with a card management system 101 and a mobile rewards gateway 103 (e.g., a server) The mobile rewards control center 102, the prepaid card management system 101, and the mobile rewards gateway 103 may be part of a single server (e.g. a single processor) executing software, or separate components (e.g., separate processors) executing separate software programs, as illustrated.

The prepaid card management system 101 communicates with a trusted service manager (TSM) 109 (e.g., a server) to establish a ghost debit/credit card account 121 used to implement the rewards redemption of the invention. As described herein, the debit/credit card account 121 will be referred to as a ghost account with a zero balance. However, as noted above, it may not be ghost account and it may have a balance corresponding to the balance of the currency account 30 of the member 80.

The role of the TSM is to provision the new virtual card\account onto the secure element of the phone. The gateway 103 provides an interface between the control center 102 and the one or more award programs platforms 107, 108 to which the member 80 the member belongs. For example, it is contemplated that the gateway 103 interface with the loyalty platform 107 owned by the administrator 120 and with the third party loyalty platform 108 owned by a third party 119. In one optional aspect, the member 80 may select via the rewards application 105 the particular retailer 122A-122N and may select the loyalty platform 107, 108 to be involved in a transaction.

Initial Application Download and Setup

Figure 3:
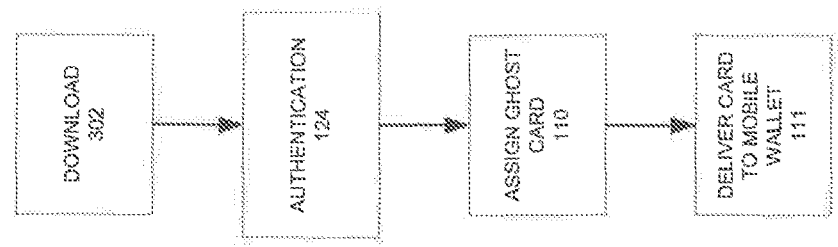
FIG. 3 illustrates the process of initially downloading and setting up on a mobile device an application according to one embodiment of the invention.

FIG. 3 illustrates the process of initially downloading and setting up on a mobile device an application according to one embodiment of the invention. The following refers to FIGS. 2 and 3.

Initially, a program member downloads at 302 a mobile rewards redemption application 105 to their mobile device 115 which is mobile payments ready (can support NFC or equivalent mobile payments protocol 106). The application 105 comprises processor executable instructions fixed in a tangible storage media. Frequently, the application 105 is a software program 105 stored at and available from a server. A copy of the application 105 is stored on the server and transferred from the server (e.g., control center 102) to the mobile device 115 where it is installed, stored and executed. The download may also include a mobile wallet 104, if the device 115 does not have one for handling the debit/credit account within the transaction.

The program member logs on via the mobile rewards redemption application 105 and responds to an authentication request at 124. If the request is confirmed at 125, the device is authenticated through a mobile rewards control center 102 which is part of the system 100 of the administrator. Authentication may be through a third party 108 if the administrator does not operate the award program.

The core mobile rewards system 100 includes a rewards control center 102 which submits a request 126 to a prepaid card management system 101 for the issuance of a zero balanced, filtered, reloadable "ghost" or virtual credit card 121.

The prepaid card management system 101 will issue at 110 a ghost credit card 121 (an account number and associated security) to the mobile device 115. The account may be zero balanced, reloadable and/or be filtered for approval by only the redemption retailers 122 participating in the award program 107, 108.

The issued ghost card 121 will be delivered at 111 to the members mobile wallet 104 associated with the mobile rewards application 105 via a TSM (Trusted Service Manager) 109 through OTA (over the air) services. A TSM is a company with the capability to securely deliver virtual credit vehicles OTA (over the air) and provision them onto mobile devices enabled with mobile payments capabilities. Upon successful delivery of the "ghost" card, the prepaid card management system 101 sends a confirmation 127 to the mobile rewards control center 102.

The ghost card 121 with zero balance will remain dormant within the mobile wallet 104 of the mobile rewards application 105 until a redemption purchase request 112 is made.

Redemption Purchase

Figure 4:
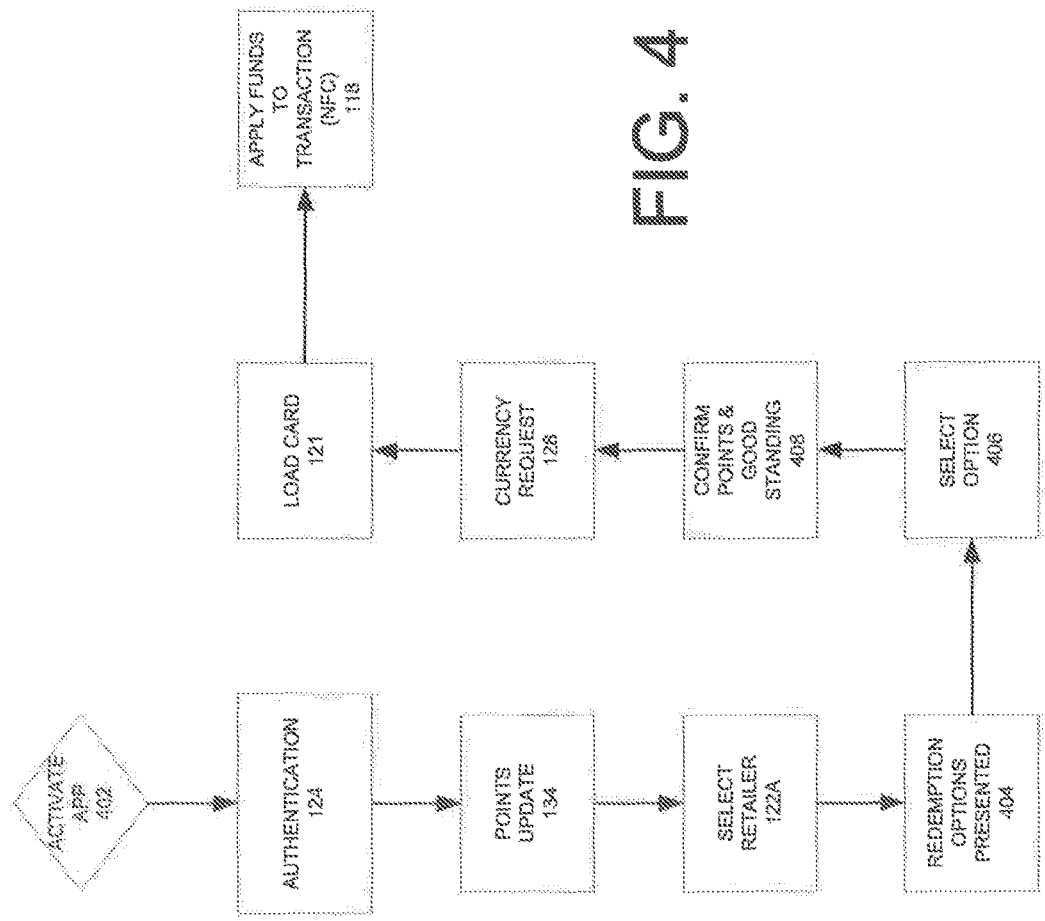
FIG. 4 illustrates the process of real-time or near real-time redemption and purchase according to one embodiment of the invention.

FIG. 4 illustrates the process of real-time (or near real time) redemption and purchase according to one embodiment of the invention. When the member via their mobile device 115 opens at 402 the mobile rewards application 105 an authentication request 124 is submitted to the mobile rewards control center 102. An authentication confirmation request 130 is sent from the control center 102 via the mobile rewards gateway 103 to the loyalty platform 107 or 108. The mobile rewards gateway 103 receives an approval or denial 132 which is subsequently relayed to the mobile rewards application 105 by the mobile rewards control center 102.

Upon successful authentication confirmation, the mobile rewards application 105 requests a points update 134 from the mobile rewards control center 102. The center 102 in turn requests and obtains a points update 131 from the loyalty platform 107 or 108. The mobile rewards control center 102 sends the points update confirmation data to the mobile rewards application 105. The data includes member 115 profile information including current points balance. The points update request 134 is initiated automatically upon each instance the mobile rewards application 105 is started or upon a specific request by the member via the mobile device 115.

The application 105 presents the member via the member's device 115 with the available redemption retailers 122 participating in the program 107, 108, which retailers 122 may be indicated by a filter applied to the ghost card 121. The application 105 also presents the member via the member's device 115 with the available funds based on the amount of points indicated by the points update confirmation data and based on an individual currency exchange rate of points to currency according to the loyalty platform 107, 108. The individual currency exchange rate may be part of the confirmation data or it may be embedded in the application 105. The mobile rewards control center 102 will store all details associated to the individual client programs 107 or 108, as well as participating redemption retailers 122. Also, the center may store the individual currency exchange rate and provide it to the application 105.

If a particular member attempts to use the program at a retailer which is not part of the participating retailers 122 of the particular member, the transaction would be terminated when the retailer 122A (FIG. 4) submits the account for approval. The retailer would not be part of the filter which identifies the retailers which are permitted to redeem the account of the particular member so the account would not be approved by the clearing house for use by the non-participating retailer.

The application 115 presents the member with the retailer 122 specific redemption options or offerings at 404 and the points value for each, e.g., redeem 1200 points for $100 at Retailer 'A' or redeem 700 points for $500 at Retailer 'A'. In one embodiment, the member can select the number of points to be redeemed or the member can select a dollar value to be applied to the debit/credit account.

The member 115 selects the desired offering at 406 and confirms their desire to redeem.

The mobile rewards management system 100 confirms that the member 115 has sufficient points by requesting a points check with the loyalty platform 107, 108, and requests a confirmation 132 that the member is in good standing at 408. The mobile rewards management system 100 deducts the redeemed points 133 from the members account 107, 108.

The mobile rewards management system 100 sends via the control center 102 a currency request 128 to the administrator's card management system 101 to issue the redeemed for dollar value to the ghost card 121. The prepaid card management system 101 issues the dollar value to the member's ghost card account 121 making the monies available for the transaction. The prepaid card management system 101 confirms at 129 that the monies have been successfully deposited into the members account associated with their 'ghost' card 121. The mobile rewards management system 100 confirms and communicates successful completion of the transaction to the member through the mobile rewards mobile application 115.

The member 115 now has the redeemed for funds available to spend at the retailer 122A at which they are located. The funds are stored on the issued ghost card 121, which in turn is securely stored within the mobile wallet 104 of the device 115.

The member can pay for products/services through a split tender transaction or single tender transaction if they have redeemed currency (points) for sufficient funds to pay for the entire purchase.

Figure 5:
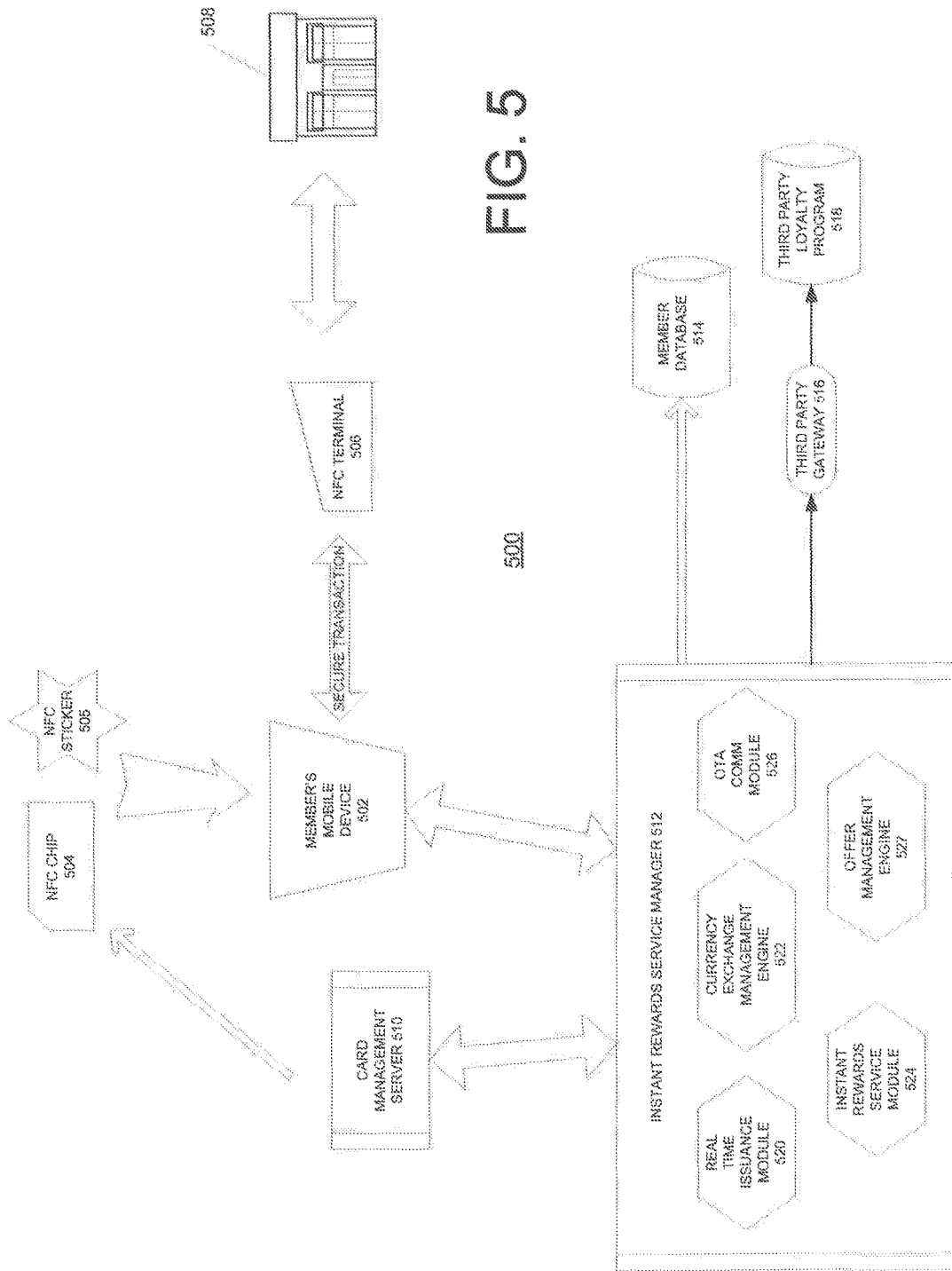
FIG. 5 is an illustration of one embodiment of various hardware and software components of the invention.

At 118, the member completes the transaction with the device 115 through the wallet 104 and application 105 communicating with a mobile payments protocol 113 such as NFC (Near Field Communications) 106 by 'tapping' their device 115 to the contactless POS terminal 117 of the retailer 122A. This initiates a standard credit transaction. The currency redeemed for will only be available for use at the identified rewards partners utilizing the filtering process of the card issuer. The transaction will be transparent to the person and the retailer (i.e., the same as any other debit/credit card transaction). The account is usable for the particular transaction at the amount selected by the person and the person is not aware of and does not otherwise have access to the account. After the transaction, of the member transacted for less then they redeemed the balance would remain on the card until their next transaction or could be returned to points based on the individual rules of the program. Although the currency is interchangeable amongst the participating retailers 122, all marketing communications to the person may be specific to the individual retailer 122A, e.g. you have redeemed 1200 points for $100 at Retailer 'A' or you have redeemed 700 points for $500 at Retailer 'A'. At this point marketing messages from the program owner 120, 119 can be delivered in real-time to the member 80, via the mobile rewards application, through the Mobile rewards control center FIG. 5 is an illustration of one embodiment of various hardware and software components of the invention. In this configuration, a system 500 of the invention includes a mobile device 502 having an NFC chip 504 which permits secure transactions via an embedded NFC terminal 506 of a retailer 508. A card management server 510 interfaces with the mobile device 502 to assist in implementing a debit/credit card account associated with a currency account of the user. In one embodiment, only one, unique debit/credit card account is associated with only one, unique currency account of a user so that transactions can be tracked by either the card account number or the currency account number. In one embodiment, only one, unique debit/credit card account is associated with all currency accounts of only one, particular user so that all transactions of the particular user can be tracked by the card account number. Alternatively, or in addition, for filtered accounts the server 510 assists in account approval. For example, the debit/credit card account may be usable with only a selected, limited number of retailers. In one embodiment, the selected retailers would correspond to retailers that participate in at the award program in which the selected retailers participate and/or support. In other words, the currency (e.g., points) account would be part of a program of which the retailer is also involved.

In one embodiment, the issued ghost card account 121 may be forwarded to a card fulfillment partner 137 (shown in FIG. 2), who will in turn create a "physical" card in the form of an NFC sticker 505 (shown in FIG. 5). The sticker 505 would be shipped 136 to the member 80 with instructions to adhere the sticker 505 to their mobile device. This solution is an alternative to or in addition to the imbedded NFC solution outlined above. When a sticker 505 is part of the system and method of the invention, the mobile wallet 104 within the device 115 is optional. All other aspects of the system and processes outlined above will remain with the NFC sticker 505.

An instant rewards service manager 512 interfaces with both the mobile device 502 and the card management server 510 to effect transactions and communication as noted above with regard to FIGS. 1-4. In one form, the manager 512 is a server which accesses a member database 514 and communicates with a third party award program 518 via a third party gateway 516. In particular, the manager 512 includes a real time issuance module 520, a currency exchange management engine 522, an instant rewards service module 524, an OTA communications module 526 and an optional offers management engine 527.

The optional offers engine 527 includes an alternative 'push' mechanism to provide the ability to issue offers to members. An offer may be associated to an action of behavior, e.g., purchase item X and receive offer Y, although any type of offer is contemplated. Based on a pre-determined action (either explicit or implicit), an offer can be pushed to the user. For example, from the perspective of the member, the offer could be in the form of tangible items, such as a free latte. All messaging through the mobile rewards application 105 could be based on a tangible item. However, in the background the tangible item (e.g., the latte) would simply have a predefined financial amount (e.g., $4.71). From the perspective of the members, they are receiving tangible items within the offer mechanism. From the perspective of the merchant, it is a traditional credit (or gift card) transaction. Offers may be time bound and expire. In the case of an expired offer, both the marketing message and the currency associated with the offer could be removed from the members account at expiration.

Once a points redemption has been requested, validated and the members account has been deducted, the real time issuance module 520 manages the issuance of currency onto the account through the card management server 510 in order to permit the member 80 to complete a purchase transaction through a participating retailer 122. The currency exchange management engine 522 allows the administrator of the program to manage several individual instances of the mobile rewards solution and provide unique currency exchange rates for individual programs or by individual retailers. For example, the exchange rate at a retailer 122A is 12,000 points for $100 dollars, while at retailer 122B the exchange rate is 14,000 points for $100. The instant rewards service module 524 provides the means to manage all redemption services such as authentication, account validation, redemption transaction. The rewards service module 524 also manages all communications and data exchange with the participating loyalty platforms 107, 108. The OTA communications module 526 provides the ability to deliver, through OTA services, real-time communications associated to the program or a transaction within the program. For example, a program owner 120 may want to send a message to a member after a transaction congratulating the member on a successful redemption.

As used herein, a program operated by platform 107, 108 includes but is not limited to any program, loyalty plan or policy used to encourage or reward a participant's use of particular, merchants which sell goods and/or services and/or encourage account (e.g., card) usage. Frequently, such programs are referred to as incentive, loyalty, frequency, affinity, retention, performance improvement or award programs (i.e., award programs). This is because such programs encourage or improve participant's loyalty, affinity, retention, quality of performance or frequency of performance. The program permits the participants to obtain a rebate or incentive such as a motivational award (such as points, cash, products and/or services). As used herein, incentives, rebates, currency and points are used interchangeably and generally denote but are not limited to any type of consideration being administered by a program. Corresponding reference characters indicate corresponding parts throughout the drawings. For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented mobile rewards redemption system comprising:
    a mobile rewards control center processor having a first set of non-transitory computer readable medium-stored executable instructions which, when executed by the mobile rewards control center processor, causes the mobile rewards control center processor to manage currency exchange and issuance, wherein currency exchange comprises transforming rewards into redeemable currency;
    a mobile rewards redemption application, wherein the mobile rewards redemption application is installed on a user's mobile device;
    a prepaid card management system processor having a second set of non-transitory computer readable medium-stored executable instructions which, when executed by the prepaid card management system processor, causes the prepaid card management system processor to establish and deliver a conversion vehicle comprising a zero balance to the user's mobile device upon authentication of an initial download of the mobile rewards redemption application wherein the conversion vehicle comprises a prepaid debit card and wherein an account number of the conversion vehicle is hidden and inaccessible by the user,
    wherein the mobile rewards control center processor in communication with the prepaid card management system processor and the user's mobile device via a computer network connection, wherein the mobile rewards control center processor manages a plurality of user rewards accounts, said accounts have account identification numbers and said rewards accounts are associated with prepaid card management accounts corresponding to the users associated with the user rewards accounts, wherein the prepaid card management system comprises an electronic wallet management system which manages a plurality of prepaid cards associated with a plurality of users, each user having an electronic wallet on such system, wherein the electronic wallet includes the conversion vehicle used for the benefit of the user, wherein the mobile rewards control center processor performs currency exchange using the conversion vehicle and requests the issuance of redeemable currency by the prepaid card management system processor, and wherein the prepaid card management system processor funds the conversion vehicle with funds to satisfy a rewards account redemption transaction after the rewards account redemption transaction has been requested by the user, and
    wherein the prepaid card management system is in communication with a plurality of point of sale terminals of a plurality of merchants.

2. The system of claim 1 wherein the prepaid card management system is an electronic wallet management system which manages a plurality of prepaid cards associated with users having electronic wallet accounts on such system.

3. The system of claim 2, wherein at least one of the plurality of user rewards accounts is connected with an electronic wallet account associated with the user; said system is configured to credit the at least one of the plurality of user rewards accounts with points and configured to convert such points into an amount applied to the electronic wallet account associated with the user.

4. The system of claim 3, wherein the system is configured to credit at least one of the plurality of user rewards accounts in response to a purchase by the user at a point of sale terminal in communication with the system.

5. The system of claim 3, wherein the system is configured to credit at least one of the plurality of user rewards accounts in response to a purchase by the user wherein purchase information is received by the system via the user's mobile device.

6. The system of claim 3 wherein the system is in communication with the user through the mobile rewards redemption application residing on the user's mobile device.

7. The system of claim 3 wherein the mobile rewards control center is configured to interface through an electronic gateway with one or more award program platforms to which the user is a member.

8. The system of claim 7 wherein the electronic wallet management system is in communication with one or more award program platforms to which the user is a member.

9. The system of claim 1 further comprising an offer engine providing offers to a via the user's mobile device in response to an action by the user.

* * * * *